US005782592A

United States Patent [19]

Row et al.

[11] Patent Number: 5,782,592

[45] Date of Patent: Jul. 21, 1998

[54] HIGH SPEED SPINDLE SOCKET CLEANING TOOL

[76] Inventors: John W. Row, P.O. Box 499, Pine; James L. Row, P.O. Box 187, Buffalo Creek, both of Colo. 80425

[21] Appl. No.: 729,013

[22] Filed: Oct. 10, 1996

[51] Int. Cl.$^{6}$ .......... B23C 9/00

[52] U.S. Cl. .......... 409/137; 15/97.1; 15/101; 15/245; 15/236.05; 483/13

[58] Field of Search .......... 15/97.1, 101, 104.05, 15/104.09, 104.16, 22.1, 210.1, 230.16, 245, 236.05; 483/13; 409/134, 137

[56] References Cited

U.S. PATENT DOCUMENTS

| | | | |
|---|---|---|---|
| 1,887,138 | 11/1932 | Peffer | 15/101 |
| 2,910,713 | 11/1959 | Row | 15/210 |
| 3,681,811 | 8/1972 | Amelung et al. | 15/104.05 |
| 4,404,728 | 9/1983 | Ishikawa | 483/13 |
| 4,468,834 | 9/1984 | David | 15/97.1 |
| 4,864,714 | 9/1989 | Von Haas et al. | 483/13 |
| 5,099,537 | 3/1992 | Denny | 15/88 |
| 5,165,133 | 11/1992 | Armbruster | 15/97.1 |
| 5,168,660 | 12/1992 | Smith | 51/181 |
| 5,307,534 | 5/1994 | Miller | 15/4 |

FOREIGN PATENT DOCUMENTS

| | | | |
|---|---|---|---|
| 256845 | 5/1988 | Germany | 483/13 |
| 47-29033 | 7/1972 | Japan | 483/13 |
| 47-29034 | 7/1972 | Japan | 483/13 |
| 360034245A | 2/1985 | Japan | B23Q 11/00 |
| 61-279318 | 12/1986 | Japan | 15/97.1 |
| 1304937 | 4/1987 | U.S.S.R. | 15/104.05 |
| 666719 | 2/1952 | United Kingdom | 15/236.05 |

*Primary Examiner*—A. L. Pitts
*Assistant Examiner*—Christopher Kirkman
*Attorney, Agent, or Firm*—John E. Reilly

[57] ABSTRACT

A table-mounted cleaning tool for cleaning spindle sockets includes a cleaning head which is shaped to conform to the configuration of the inner wall surface of the socket including wiper blades at spaced intervals around the external surface of the cleaning head, and the head is resiliently mounted on a base which is movable on a table into and out of alignment with the spindle socket so that the spindle socket can be advanced and rotated into and out of engagement with the cleaning head, and the resilient mounting of the head permits it to be self-centering when at rest and when inserted into the socket and to uniformly engage the wall of the socket for most efficient cleaning.

19 Claims, 2 Drawing Sheets

HIGH SPEED SPINDLE SOCKET CLEANING TOOL

BACKGROUND AND FIELD OF INVENTION

This invention relates to socket cleaning tools; and more particularly to a novel and improved reaming device which can be table-mounted and movable rapidly into and out of engagement with a spindle socket on a milling head for the purpose of cleaning same.

Modern machine tools or machining centers typically have a milling head with spindle situated above a movable table, and the movable table will advance each work piece into alignment with the spindle. For instance, machining centers typically are programmable to correlate the movement and speed of the spindle with respect to the work piece in milling one or more holes in the work piece. A problem associated with machine tools of the type described is the ability to clean the spindle socket through which the milling tool holder or other interchangeable tooling moves without interrupting or substantially delaying the machining operation.

In providing a table-mounted cleaning tool, it is important that the tool be capable of centering itself with respect to the socket as it is rapidly moved into and out of engagement, is capable of uniformly engaging the inner wall of the socket to remove all scrapings and foreign material within a minimum amount of time, and that the tool be self-cleaning as well as self-adjusting to compensate for wear. Various cleaning tools have been devised in the past and representative patents are U.S. Pat. Nos. 5,099,537 to T. R. Denny, 5,168,660 to R. A. Smith, 5,165,133 to F. O. Armbruster and 5,307,534 to R. P. Miller and Japanese Patent No. 360034245 to Hitoshi. U.S. Pat. No. 2,910,713 to J. W. Row discloses a hand-held socket cleaner which employs radially mounted, circumferentially spaced plastic wiper blades on a frustoconical cleaning head. However, to the best of our knowledge, no one has devised a tool which is self-centering and self-adjusting in the manner described so as to be capable of being table-mounted and program-controllable to move rapidly into and out of engagement with the inner wall of the socket.

SUMMARY OF THE INVENTION

It is therefore an object of the present invention to provide for a novel and improved socket cleaning tool.

Another object of the present invention is to provide for a novel and improved table-mounted socket reamer specifically adaptable for use in cleaning frustoconical sockets, such as, the spindle sockets employed in milling heads; and further wherein the reamer will align its center line with that of the spindle socket to effect uniform engagement with the inner wall of the socket and is self-adjusting to compensate for any wear after repeated use of the tool.

A further object of the present invention is to provide for a novel and improved socket cleaning tool conformable for use in cleaning various types of sockets and which is usable either by hand or can be table-mounted and programmed to move in and out of engagement with the spindle socket between milling operations.

In accordance with the present invention, a socket cleaning device for cleaning an inner wall surface of a socket comprises a base member, an elongated head shaped to conform to the configuration of the inner wall surface, the head being of generally circular cross-sectional configuration and having circumferentially spaced wiper blades extending substantially parallel to the length of the head and projecting from an external surface thereof, and means resiliently mounting the head on the base wherein the head is self-centering when inserted into the socket to effect uniform engagement between the wiper blades and the inner wall surface of the socket. Preferably, the bias means takes the form of spring-loaded fasteners extending upwardly from the base into a mounting plate for the cleaning head at uniformly spaced circumferential intervals outwardly of the cleaning head. In this way, the cleaning device can be table-mounted and automatically controlled into and out of alignment with a spindle socket, for example, of the type employed on a milling head. Once aligned with the spindle socket, the spindle is driven downwardly into engagement with the cleaning device and rotated for a limited number of revolutions necessary to effect cleaning of the socket. The resilient mounting will effectively compensate for any slight misalignment between the spindle and cleaning head in order to assure uniform engagement therebetween, yet return to a fixed location with respect to its mounting base when at rest.

A preferred form of cleaning head employs wiper blades on the head which are canted with respect to a center line or longitudinal axis of the head so that radial pressure between the blades and inner wall surface of the socket will cause the radial edges to undergo bending into flush engagement with the wall of the socket.

The above and other objects of the present invention will become more readily appreciated and understood from a consideration of the following detailed description of preferred and modified forms of the present invention when taken together with the accompanying drawings in which:

BRIEF DESCRIPTION ON OF THE DRAWINGS

DETAILED DESCRIPTION OF PREFERRED EMBODIMENT

Figure 1:
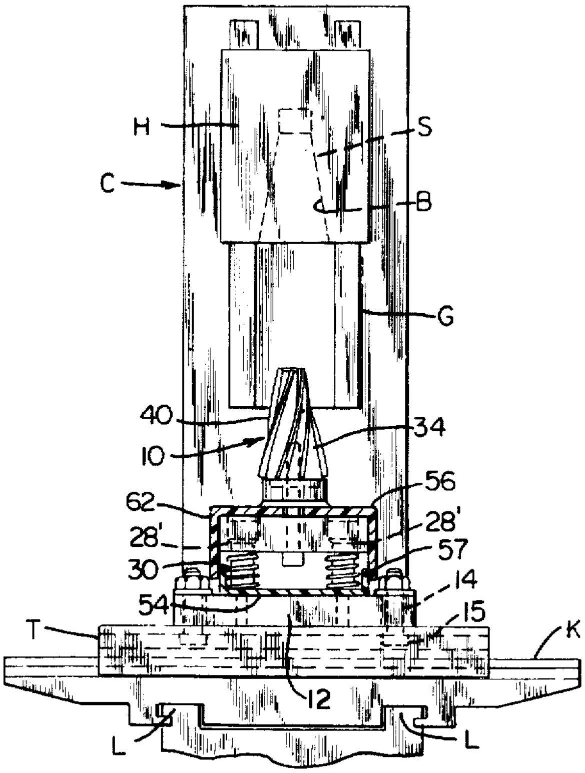
FIG. 1 is a front view partially in section of a preferred form of cleaning device mounted on a vertical center.
Figure 2:
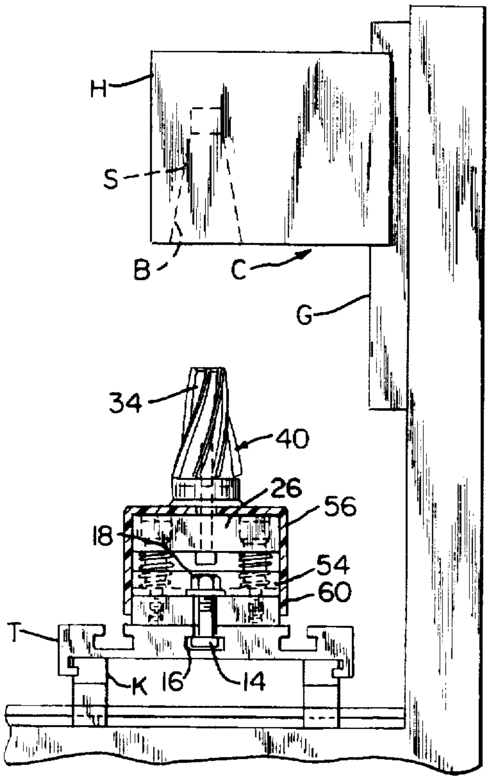
FIG. 2 is a side view partially in section of the cleaning device shown in FIG. 1.
Figure 3:
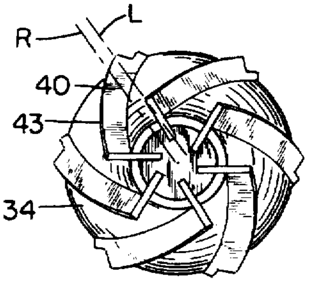
FIG. 3 is an enlarged top plan view of the cleaning head of the preferred form of cleaning device.

Referring in more detail to the drawings, a preferred form of cleaning device or tool 10 is shown by way of illustrative example in FIGS. 1 and 2 mounted on a table T of a vertical machine center C. The center C is of a type having a milling head H with a spindle socket S which is program-controlled in a well-known manner to advance vertically along a guide track G into and out of engagement with a work piece, not shown, positioned on the table T. The table T is reciprocal laterally along an X coordinate defined by guideways K and further is slidable or reciprocal in a perpendicular direction along a Y coordinate defined by the ways L.

Figure 6:
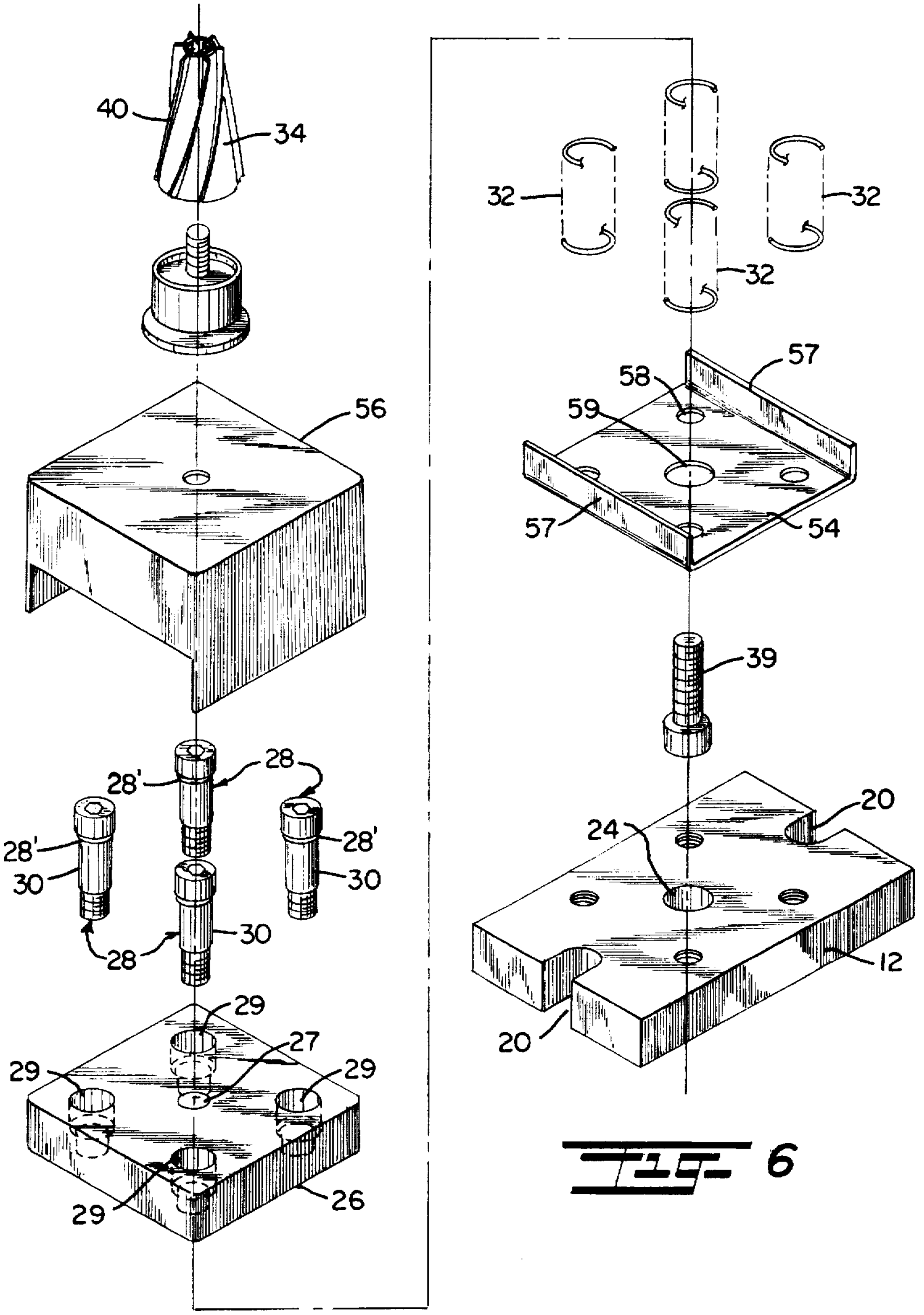
FIG. 6 is an exploded view of the preferred form of cleaning device shown in FIGS. 1 to 5.

The spindle socket S has a frustoconical inner wall surface or bore B which receives interchangeable tooling, such as, a drill or other milling tool, not shown. Under repeated use, chips, scrapings and other foreign particles will collect along the inner wall surface B and, particularly in an automated machining operation, it is important to be able to automatically clean the spindle socket S periodically without substantially interrupting or delaying the machining operation. To this end, the cleaning tool 10 is comprised of a base member 12 in the form of a flat rectangular block which is releasably affixed to the table T by Tee bolts 14, each bolt 14 having an enlarged head 15 insertable in a generally T-shaped slot 16 in the table T. The T-shaped slot 16 forms a standard part of the table with a series of slots 16 at spaced parallel intervals across the width of the table. The base 12 is firmly affixed to the table by securely tightening nuts 18 to upper threaded ends of the bolts 14, the bolts 14 being inserted in open slots 20 at opposite ends of the base member 12. A plurality of threaded bores 22 are disposed at spaced intervals in the block 12, there being preferably four bores 22 at 90° intervals around a common central opening or bore 24 in the base, as best seen from FIG. 6.

A mounting block 26 is resiliently mounted on the base by means of spring-loaded fasteners including a series of shoulder screws 28 extending downwardly through bores 29 in the mounting block 26 into threaded engagement with the bores 22 in the base member 12. The screws 28 have enlarged tapered head portions 28' which are seated in correspondingly tapered counterbores at the upper ends of the openings 29, as best seen from FIGS. 1 and 2. A non-threaded shoulder portion 30 of each screw 28 is surrounded by a coil spring member 32 interposed between the base member 12 and the mounting block 26, the spring 32 being mounted under compression so as to yieldingly resist any downward deflection of the mounting block 26.

A cleaning head 34 comprises a generally conical body portion 36 having a threaded bore at its lower end to receive a threaded fastener 37 projecting upwardly from a cylindrical support block 38. The cylindrical support 38 includes a skirt portion at its upper end which surrounds the lower end of the body 36 when the head 34 is threaded onto the fastener 37. The head 34 is affixed to the mounting block 26 by another threaded fastener 39 extending upwardly from a central opening 27 in the mounting block 26 and into threaded engagement with a mating bore, not shown, in the lower end of the support block 38. The central opening 24 in the base affords access to an Allen-head end of the fastener 39.

Figure 4:
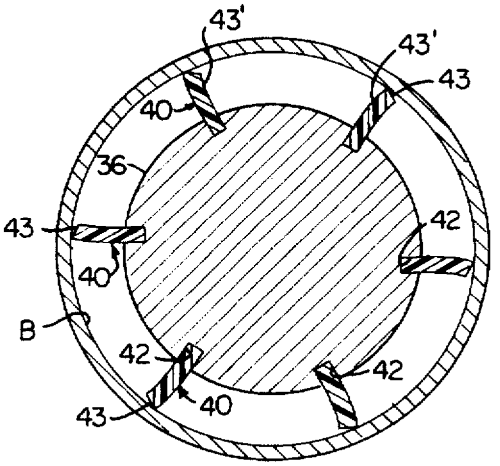
FIG. 4 is a cross-sectional view enlarged of the cleaning head shown in FIG. 3.
Figure 5:
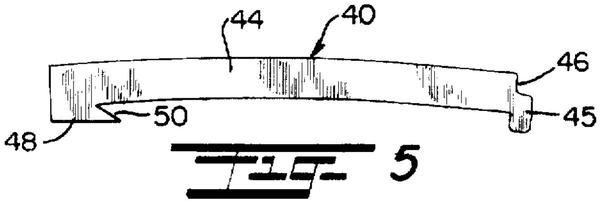
FIG. 5 is an enlarged view in detail of one of the wiper blades employed in the cleaning head of the preferred form of cleaning device.

A series of wiper blades 40 are arranged in circumferentially spaced relation to one another around the external surface of the head 34, the blades being inserted into longitudinal grooves 42 which extend in generally spiral fashion along the full length of the head 34. The width of each groove 42 is disposed on an imaginary line L which is slightly offset from a radial line R extending from the longitudinal axis of the head so that the wiper blade 40 when inserted into the groove is slanted in somewhat trailing relation to the direction of rotation of the spindle socket S. In this way, the outer edge 43 of each blade 40 will be flexed somewhat as it engages the inner wall surface of the socket S and be substantially flush with the inner wall surfaces, as best seen from FIG. 4, when the socket is rotated in a clockwise direction as shown in FIG. 4. Preferably, each wiper blade 40 is composed of a high strength material of limited flexibility, such as, for instance, Nylon, polyethylene, vinyl chloride, rubber or synthetic rubber. Further, as seen from FIG. 5, each wiper blade 40 is in the form of a thin, elongated strip having a central or intermediate portion 44 of uniform width with a lateral projection 45 at its lower end which is notched as at 46 to accommodate the skirt portion 39; and at the opposite end of each blade, a laterally projecting portion 48 includes a generally V-shaped notch 50 which is inserted into a complementary notched portion, not shown, at the upper end of the respective groove 42 in the manner more clearly illustrated in U.S. Pat. No. 2,910,713. Thus, the blades 40 are securely retained in position when the blades 40 are seated in the respective grooves 42 with their upper ends 48 hooked into the upper edges of the grooves and the support member 38 is threaded onto the lower end of the head until the skirt portion 39 moves into snug-fitting engagement with the notched portions 46 at the lower edges of the blades 40.

In order to prevent the entry of chips or other foreign matter in and around the mounting block 26 and base 12, a protective cover assembly is provided and which is broadly comprised of a lower rectangular plate 54 and upper cover plate 56. As best seen from FIG. 6, the lower plate 54 includes upwardly extending side walls 57 on two opposite sides of the plate 54, a series of outside openings 58 which are alignable with the openings 22 in the base member and a central opening 59 which is alignable with the central opening 24 in the base member. The plate 54 is mounted on the top surface of the base member by the spring-loaded fasteners 28. The upper cover plate 56 includes downwardly extending side walls 60 on two opposite sides of the plate and a pair of shorter side walls 62 on the other two opposite sides of the plate and which extend downwardly but not to the same extent or distance as the side wall 60. The cover plate 56 has a central opening 64 so that when the cover plate is mounted over the mounting block 26, the opening 64 will be aligned with the opening 27 to receive the upper threaded end of the fastener 39. In this way, the cover plate 56 will be firmly held in position between the support block 38 and the mounting block 26. Once assembled as described, the longer side wall 60 will extend downwardly to overlap opposite sides of the base member 12; however, the walls 62 will terminate above the base 12 in overlapping relation to the side walls 57 so as not to interfere with any downward deflection of the mounting block 26 with respect to the base member 12 when the cleaning tool is in use. The gap between the wall 62 and base 12 is substantially covered or closed by the side walls 57 on the lower plate 54 which extend upwardly inside of the wall 62, as shown in FIG. 1.

When employed in machining operations, the cleaning tool may be mounted on a table T as described or on a separate device which can be advanced into alignment with the milling head H, as illustrated in FIGS. 1 and 2, between machining operations. Once aligned, the milling head is activated to drive the spindle downwardly causing the cleaning head 34 to extend upwardly into the bore B. The cleaning head 34 is dimensioned to correspond in configuration and size with the bore or inner wall surface to be cleaned so that the outer edges 43 of the blade members 40 will bear firmly and uniformly against the inner wall surface B of the socket. The socket S is then activated through a series of revolutions during which the outer edges 43 will scrape the inner wall surface B and collect any foreign particles or matter along the leading edges 43' of the blades 40. By virtue of the offset angle or slant of the blades 40 in their respective grooves 42, the outer edges 43 will tend to lean into the direction of travel of the inner wall surface but will be deflected by the inner wall surface slightly in a clockwise direction, as illustrated in FIG. 4 so that the leading edge 43' will be the primary contact surface. Any misalignment between the cleaning head 34 and wall surface B is compensated for by the resilient mounting of the mounting block 26 with respect to the base member 12 and the ability of the mounting block 26 to deflect downwardly about one or more of the spring-loaded fasteners 28 in response to unbalanced pressure or lateral thrusting against the cleaning head 34. The blades 40 when mounted in the grooves 42 are given a righthand spiral as shown to encourage downward movement of foreign matter toward the shirt portion 39 during the cleaning operation. As the socket S moves away from engagement with the blades 40, the blades 40 will be free to straighten or spring back into their original configuration so that any foreign particles then may drop away from the blades 40 onto the chip shield 56 or table T. Moreover, the counterbores of the openings 19 are tapered in a direction to be complementary to the head portions 28 to cause the block 26 and the cleaning head 34 to return to their original centered or fixed position when downward pressure is no longer exerted on the head 34.

The operation of the cleaning tool 10 can be programmed and correlated with machining operations so that movement of the cleaning tool in and out of alignment with the milling head is coordinated with the other machining operations to result in a minimum of interruption or delay.

It will be evident that while the preferred embodiment of the present invention has been described for use in connection with programcontrolled machining operations, the improved form of cleaning head is readily conformable for use as a hand tool, for example, by securing the cylindrical support block 38 to a handle to perform manual cleaning of a socket or bore. Further, it will be apparent that the specific configuration and size of the cleaning head may be modified to conform to that of the inner wall surface to be cleaned.

It is therefore to be understood that while a preferred form of invention is herein set forth and described, various modifications and changes may be made in the construction and arrangement of parts without departing from the spirit and scope of the present invention as defined by the claims and reasonable equivalents thereof.

We claim:

1. A cleaning tool for cleaning an inner wall surface of a socket comprising:

a base member;

an elongated head shaped to conform to the configuration of the inner wall surface, said head being of generally circular cross-sectional configuration and having circumferentially spaced wiper blades extending substantially parallel to the length of said head and on an external surface thereof; and bias means resiliently mounting said head on said base for aligning the centerline of said head with that of said socket when inserted into said socket to effect uniform engagement between said wiper blades and the inner wall surface of said socket.

2. A cleaning tool according to claim 1, wherein said head includes a mounting block, said bias means extending between said mounting block and said base.

3. A cleaning tool according to claim 2, wherein said bias means includes resilient support members extending between aligned corners of said mounting block and said base.

4. A cleaning tool according to claim 3, wherein said resilient support members each comprises a spring-loaded connecting bolt between said mounting plate and said base.

5. A cleaning tool according to claim 1, wherein said wiper blades each comprises an elongated plastic strip mounted in a slot extending the substantial length of said head.

6. A cleaning tool according to claim 5, wherein each of said slots extends in a generally spiral direction along the external wall surface of said head.

7. A cleaning tool according to claim 5, wherein each of said blades has an outer radial edge slanted with respect to a center line of said head whereby radial pressure between said blades and the inner wall surface of said socket will cause said radial edges to undergo bending into flush engagement with said inner wall surface.

8. A cleaning tool for cleaning an inner wall surface of a socket comprising:

a base member; and an elongated head of generally circular cross-sectional configuration having circumferentially spaced wiper blades extending longitudinally along an external surface of said head, each of said blades having an outer radial edge slanted with respect to a center line of said head whereby radial pressure applied between said blades and the inner wall surface of said socket when said socket is rotated will cause said radial edges to undergo limited bending into uniform engagement with said inner wall surface.

9. A cleaning tool according to claim 8, wherein each said radial edge includes a leading contact edge movable into flush engagement with said inner wall surface when said socket is rotated with respect to said head.

10. A cleaning tool according to claim 8, wherein each said wiper blade is removably positioned on said cleaning head, each said wiper blade extending spirally in a lengthwise direction along the external surface of said head.

11. A cleaning tool according to claim 8, wherein each of said wiper blades is composed of an elongated plastic strip mounted in a slot extending the substantial length of said head.

12. A cleaning tool according to claim 8, wherein said base includes means resiliently mounting said head on said base whereby said head is self-centering when inserted into engagement with an inner wall of said socket.

13. A cleaning tool according to claim 8, wherein said head includes a mounting block, and bias means extending between said base and said mounting block.

14. In a machine tool of the type having a milling head provided with a spindle socket movable along a guide track into and out of engagement with a work piece wherein the work piece is positioned on a movable table, said spindle socket having an inner frustoconical wall surface, the improvement comprising:

a cleaning tool having a base member mounted on said table, an elongated cleaning head including wiper blades shaped to conform to the configuration of said inner wall surface of said socket, and bias means resiliently mounting said head on said base whereby said head is self-centering when inserted into said socket and said socket is rotated to effect uniform engagement between said head and the inner wall surface of said socket.

15. In a machine tool according to claim 14, including a mounting block, said bias means including downwardly tapering shoulder screws extending downwardly from said mounting block and into said base, and said bias means includes resilient support members in surrounding relation to said screws and extending between aligned corners of said mounting block and said base.

16. In a machine tool according to claim 15, wherein a chip shield is disposed on said mounting.

17. In a machine tool according to claim 16, wherein said chip shield includes an upper cover plate on said mounting block and a lower cover plate beneath said base member.

18. A cleaning tool according to claim 14, wherein each of said blades has an outer radial edge slanted with respect to a center line of said head whereby radial pressure between said blades and the inner wall surface of said socket will cause said radial edges to undergo bending into flush engagement with said inner wall surface.

19. A cleaning tool according to claim 14, wherein said head is non-powered, and said spindle socket is rotatable with respect to said head.

* * * * *